United States Patent
Luo et al.

(10) Patent No.: US 11,307,973 B2
(45) Date of Patent: Apr. 19, 2022

(54) METHOD AND DEVICE FOR TESTING ROBUSTNESS AND STABILITY OF SMM, AND STORAGE MEDIUM

(71) Applicant: ZHENGZHOU YUNHAI INFORMATION TECHNOLOGY CO., LTD., Henan (CN)

(72) Inventors: Pengfang Luo, Henan (CN); Guangyao Cao, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 349 days.

(21) Appl. No.: 16/493,269

(22) PCT Filed: Dec. 25, 2018

(86) PCT No.: PCT/CN2018/123477
§ 371 (c)(1),
(2) Date: Sep. 11, 2019

(87) PCT Pub. No.: WO2020/000950
PCT Pub. Date: Jan. 2, 2020

(65) Prior Publication Data
US 2021/0357312 A1    Nov. 18, 2021

(30) Foreign Application Priority Data
Jun. 27, 2018   (CN) .......................... 201810678976.2

(51) Int. Cl.
*G06F 11/00*    (2006.01)
*G06F 11/36*    (2006.01)

(52) U.S. Cl.
CPC ............................... *G06F 11/3688* (2013.01)

(58) Field of Classification Search
CPC .................................................. G06F 11/3688
See application file for complete search history.

(56) References Cited

U.S. PATENT DOCUMENTS 7,269,768 B2    9/2007  Rothman
9,395,919 B1 *  7/2016  Chu ..................... G06F 9/4406
(Continued)

FOREIGN PATENT DOCUMENTS

CN          1797367 A        7/2006
CN        101727349 A        6/2010
(Continued)

OTHER PUBLICATIONS

The 1st Office Action regarding Chinese Patent Application No. CN201810678976.2, dated Jul. 3, 2020 English Translation.
(Continued)

*Primary Examiner* — Joshua P Lottich
(74) *Attorney, Agent, or Firm* — Yue (Robert) Xu; Apex Attorneys at Law, LLP

(57) ABSTRACT

There are provided a method and a device for testing robustness and stability of an SMM, and a computer readable storage medium. In the method, a target variable is firstly obtained, and it is judged whether an SMI is triggered. Once it is judged that the SMI is triggered, the SMM is entered. In the SMM, a target testing model corresponding to a current value of the target variable is determined, and a target SMM function is tested with the target testing model pre-stored in a system management memory, and serial port information is printed by using firmware to determine the robustness and stability of the SMM, thereby achieving the testing for the robustness and stability of the SMM.

16 Claims, 2 Drawing Sheets

(56) References Cited

U.S. PATENT DOCUMENTS

| | | | |
|---|---|---|---|
| 2004/0078681 A1 | 4/2004 | Ramirez | |
| 2008/0010548 A1* | 1/2008 | Huang | G06F 11/221 714/43 |
| 2011/0271268 A1 | 11/2011 | Dang | |
| 2013/0151569 A1* | 6/2013 | Therien | G06F 9/44 707/803 |
| 2013/0275810 A1* | 10/2013 | Yigzaw | G06F 11/263 714/32 |
| 2014/0032978 A1 | 1/2014 | Yasuda et al. | |
| 2016/0357657 A1 | 12/2016 | Zhang et al. | |
| 2018/0226136 A1 | 8/2018 | Jeansonne et al. | |

FOREIGN PATENT DOCUMENTS

| | | |
|---|---|---|
| CN | 102236621 A | 11/2011 |
| CN | 103257922 A | 8/2013 |
| CN | 105487865 A | 4/2016 |
| CN | 107179911 A | 9/2017 |
| CN | 108959049 A | 12/2018 |
| WO | 2017131679 A1 | 8/2017 |

OTHER PUBLICATIONS

Xu Yang, Detecting System Management Mode Vulnerability Based on Cache Replacement, the 14th National Conference on Fault-tolerant Computing of china computer federation Professional Committee for Fault-tolerant Computing(CFTC"2011)Proceedings, pp. 275-279.

International Search Report for PCT/CN2018/123477 dated Apr. 8, 2019, ISA/CN.

\* cited by examiner

METHOD AND DEVICE FOR TESTING ROBUSTNESS AND STABILITY OF SMM, AND STORAGE MEDIUM

The present application is a national phase application of PCT international patent application PCT/CN2018/123477, filed on Dec. 25, 2018 which claims priority to Chinese Patent Application No. 201810678976.2, titled "METHOD AND DEVICE FOR TESTING ROBUSTNESS AND STABILITY OF SMM, AND STORAGE MEDIUM", filed on Jun. 27, 2018 with the Chinese Patent Office, both of which are incorporated herein by reference in their entireties.

FIELD

The present disclosure relates to the field of computer technology, and in particular to a method and a device for testing robustness and stability of an SMM, and storage medium.

BACKGROUND

With the rapid development of computer system hardware, a system has more and more CPUs, and the overall multi-task processing performance is greatly improved. However, events of a CPU processed by the system firmware using a system management interrupt (SMI) become more complicated, and more and more tasks are required to be performed. In an operating system environment, the system is required to frequently enter a system management mode (SMM) to process tasks. Therefore, it is important to verify robustness and stability of the SMM.

In the conventional technology, the server processes the SMI in various operating system environments, and serial port information is printed by using firmware to verify the processing flow of the SMI, so as to test the robustness and stability of the SMM. However, due to characteristics of the SMM, various tests performed by the server in the various operating system environments but not in the SMM cannot cover all SMM functions. In this case, a server product having a defect in the SMI processing flow or the function design may pass the test for the robustness and stability of the SMM, and may go down due to the effect after the server product is sold, affecting the user experience.

Therefore, a technical problem to be solved presently by those skilled in the art is how to effectively test the robustness and stability of the SMM, to avoid a case that a server product goes down due to a defect of the SMI processing flow or the function design, so as to improve the user experience.

SUMMARY

A method for testing robustness and stability of an SMM is provided in the present disclosure. The method includes: acquiring a target variable and judging whether an SMI is triggered; entering the SMM if it is judged that the SMI is triggered; determining a target testing model corresponding to a current value of the target variable according to a predetermined correspondence relationship; and testing a target SMM function with the target testing model, and printing serial port information by using firmware to determine the robustness and stability of the SMM, where the target testing model corresponds to the target SMM function and is pre-stored in a system management memory.

A device for testing robustness and stability of an SMM is provided in the present disclosure. The device includes: an acquiring and judging module, an entering module, a determining module, and a testing and printing module. The acquiring and judging module is configured to acquire a target variable and judge whether an SMI is triggered. The entering module is configured to: if it is judged that the SMI is triggered, enter the SMM and trigger the determining module. The determining module is configured to determine a target testing model corresponding to a current value of the target variable according to a predetermined correspondence relationship. The testing and printing module is configured to: test a target SMM function with the target testing model, and print serial port information by using firmware to determine the robustness and stability of the SMM. The target testing model corresponds to the target SMM function and is pre-stored in a system management memory.

A device for testing robustness and stability of an SMM is further provided in the present disclosure. The device includes: a memory and a processor. The memory is configured to store a testing program. The processor is configured to execute the testing program to implement the method for testing robustness and stability of an SMM described above.

A computer readable storage medium is further provided in the present disclosure. The computer readable storage medium has stored thereon a testing program. The testing program, when executed by a processor, causes the processor to implement the method for testing robustness and stability of an SMM described above.

BRIEF DESCRIPTION OF THE DRAWINGS

In order to more clearly illustrate embodiments of the present disclosure, the drawings to be used in the embodiments are briefly described below. Apparently, the drawings in the following description only show some embodiments of the present disclosure, and other drawings may be obtained by those skilled in the art from the drawings without any creative work.

DETAILED DESCRIPTION OF THE EMBODIMENTS

Technical solutions in embodiments of the present disclosure are clearly and completely described below in conjunction with the drawings in the embodiments of the present disclosure. It is apparent that the embodiments described herein are only some embodiments of the present disclosure, rather than all the embodiments. All other embodiments obtained by those skilled in the art based on the embodiments of the present disclosure without any creative work fall into the protection scope of the present disclosure.

An object of the present disclosure is to provide a method and a device for testing robustness and stability of an SMM, and a storage medium, to effectively test the robustness and stability of the SMM, so as to a case that a server product goes down due to a defect of an SMI processing flow or a function design, and thus improve user experience.

In order to make those skilled in the art better understand the technical solutions in the present disclosure, the present disclosure is further described in detail below in conjunction with the drawings and specific embodiments.

Figure 1:
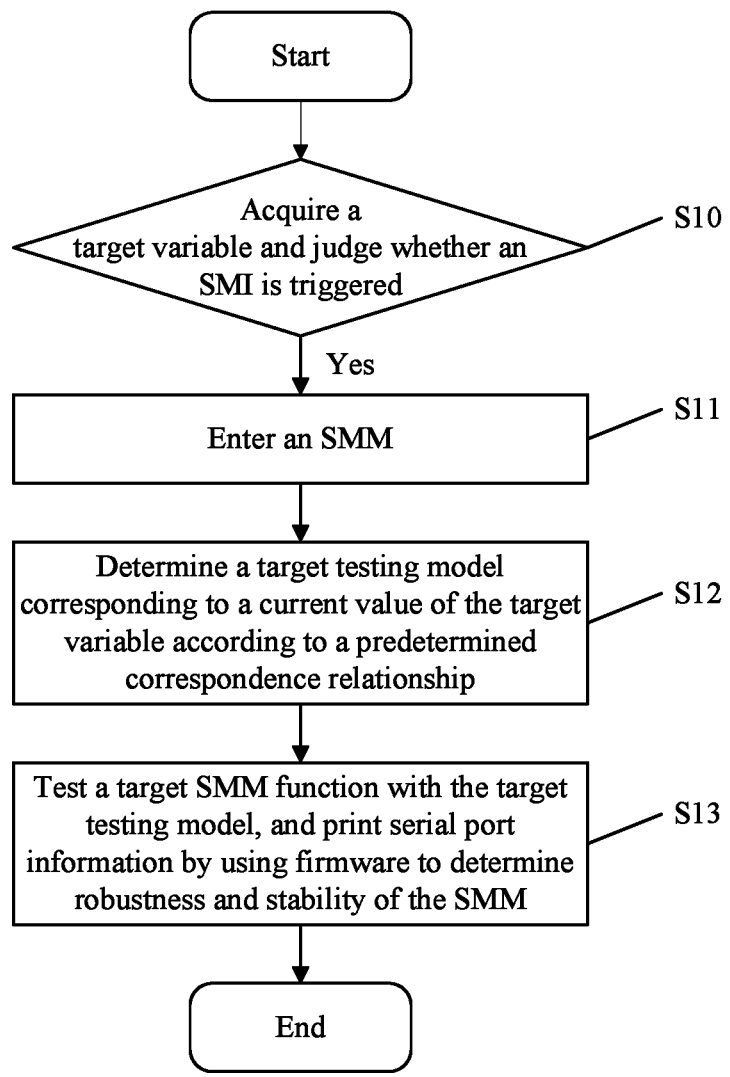
FIG. 1 is a flowchart showing a method for testing robustness and stability of an SMM according to an embodiment of the present disclosure.

Reference is made to FIG. 1, which is a flowchart showing a method for testing robustness and stability of an SMM according to an embodiment of the present disclosure. As shown in FIG. 1, the method for testing robustness and stability of an SMM according to this embodiment includes the following steps S10 to S13.

In S10, a target variable is acquired, and it is judged whether an SMI is triggered.

If it is judged that the SMI is triggered, the method proceeds to step S11.

If it is judged that the SMI is not triggered, step S10 is repeated.

The target variable may be a pre-specified system variable, or may include multiple system variables set in a pre-specified address segment. Different values of the target variable correspond to different SMM functions. In a case that a certain SMM function is required to be tested, a user may assign a value corresponding to the SMM function to the target variable and trigger the SMI to test the SMM function. In a case that all SMM functions are required to be tested, the user may sequentially assign all values corresponding to the SMM functions to the target variables, and trigger the SMI once for each value. Specifically, it is assumed that specific testing parameters have been pre-integrated into a testing model, and the target variable is a pre-specified system variable. If the value of the target variable is 1, which corresponds to a first SMM function, the user may assign 1 to the target variable and trigger the SMI to test the first SMM function. If the values of the target variable are respectively 1 to 4, which respectively correspond to a first SMM function, a second SMM function, a third SMM function and a fourth SMM function, the user may firstly assign 1 to the target variable and trigger the SMI to test the first SMM function. After the first SMM function is tested, the user may assign 2 to the target variable and trigger the SMI to test the second SMM function, and so on, until the fourth SMM function is tested. In this way, the first SMM function to the fourth SMM function are all tested. Similarly, in a case that specific testing parameters are not pre-integrated into a testing model, and the target variable includes multiple system variables set in a pre-specified address segment, the process of testing the SMM function is similar to the above process, which is not described again.

Previously, an interrupt program is processed by using INT x in an x86 architecture. As more and more interrupts are required to be processed, the CPU provides a system management interrupt, i.e., the SMI, in order to make it easier for software and hardware designers to design interrupt programs meeting requirements. The SMI is independent of other forms of interrupts and cannot be masked. Further, a system management mode, i.e., an SMM, is accordingly introduced into CPUs such as intel386 and intel486. The SMI is the only way to enter the SMM, and is classified into a software interrupt and a hardware interrupt. That is, the SMI may be set by a program or may be generated by an external hardware. For example, the SMI may generated by an error pin of a CPU. Therefore, the SMI may be effectively triggered by an SMI pin of a processor or by SMI information over an Advanced Program Interface Controller (APIC) bus.

In S11, an SMM is entered.

The SMM is a special operating mode in which advanced power management, hardware control, and execution of an OEM code may be performed. The SMM is completely transparent to an operating system. In this case, the operating system does not know when the CPU enters and exits the SMM. In the SMM, the CPU is required to have a memory region SMRAM. Before the CPU enters the SMM, the CPU stores a value of a register in the SMRAM. Then, the CPU jumps to an entry of an SMI processing program in system firmware to execute the processing program. Generally, the system has multiple CPUs. After entering the SMM, the system firmware selects a main CPU to execute main processing programs, and other CPUs are mostly in a state of waiting for task and are activated only when notified by the main CPU to perform a task. After the CPU completes the SMI processing program, the CPU jumps back to the original place by means of an RSM instruction to perform operations, and the value of the CPU register is restored.

In recent years, with the rapid development of computer system hardware, a system has more and more CPUs, and the overall multi-task processing performance is greatly improved. However, events of a CPU processed by the system firmware using an SMI become more complicated, and more and more tasks are required to be performed, particularly, multichannel systems require many system resources. In an operating system environment, the system frequently enters an SMM to process tasks. Therefore, an effective testing method is required to be provided for an SMI processing flow and an SMM resource design, to test robustness and stability of the SMM of the system. However, in the conventional technology, the SMM function can be tested only in the operating system environment, but cannot be tested in the SMM, resulting in the testing not covering all SMM functions. In this case, a server product having a defect in the SMI processing flow or the function design may pass the test for the robustness and stability of the SMM, and may go down due to the effect after the server product is sold, affecting the user experience. Therefore, in the method for testing robustness and stability of an SMM according to this embodiment, once the SMI is triggered, the method proceeds to step S11, so that the testing is performed in the SMM to make the testing cover all SMM functions, so as to effectively test the robustness and stability of the SMM, thereby avoiding the case that a server product goes down due to a defect of an SMI processing flow or a function design, and improving the user experience.

In S12, a target testing model corresponding to a current value of the target variable is determined according to a predetermined correspondence relationship.

The target testing model is pre-stored in a system management memory.

The target testing model is essentially a testing program which is required to run in the SMM. The system management memory is the SMRAM. A program executed in the SMM is called as an SMM processing program. Since all SMM processing programs can run only in the space of the SMRAM, the target testing model is required to be pre-stored in the system management memory. The target testing model corresponding to the current value of the target variable is determined in step S12, and the predetermined correspondence relationship is not required to be implanted into the system management memory with the target testing model. The predetermined correspondence relationship represents a correspondence relationship between possible values of the target variable and testing models. According to the correspondence relationship, the target testing model corresponding to the current value of the target variable can be determined after step S12 is performed, so that the CPU can execute a testing code corresponding to the target testing model.

In S13, a target SMM function is tested with the target testing model, and serial port information is printed by using firmware to determine the robustness and stability of the SMM.

The target testing model corresponds to the target SMM function.

After step S12 is performed, the target testing model is determined. The target SMM function may be directly tested with the target testing model in step S13. In the process of testing the target SMM function with the target testing model, testing data, i.e., serial port information, may be generated. The user may know whether the SMI processing flow or the function design has a defect based on the serial port information, to further determine the robustness and stability of the SMM. Therefore, in step S13, while the target SMM function is tested with the target testing model, the serial port information is printed by using firmware.

Generally, after the testing program corresponding to the target testing model is executed, the CPU automatically exits the SMM and returns to the operating system, that is, the CPU returns to a state before the SMI is triggered. It should be understood that, if a fault injection test is performed, the CPU can not automatically exit the SMM after the testing program corresponding to the target testing model is executed, and in this case, the user may directly verify the testing result.

In addition, it should be noted that, in order to ensure high reliability of the server product, the target variable is removed and the testing model is deleted preferably before the server product is distributed. That is, the testing code corresponding to the testing model is deleted.

In summary, in the method for testing robustness and stability of an SMM according to this embodiment, a target variable is firstly obtained, and it is judged whether an SMI is triggered. Once it is judged that the SMI is triggered, the SMM is entered. In the SMM, a target testing model corresponding to a current value of the target variable is determined, and a target SMM function is tested with the target testing model pre-stored in a system management memory, and serial port information is printed by using firmware. The printed serial port information is used to determine the robustness and stability of the SMM, thereby achieving the testing for the robustness and stability of the SMM. It can be seen that, with the method, the testing can be performed in the SMM, so that the problem that the testing in an operating system environment cannot cover all SMM functions is overcome, and the robustness and stability of the SMM can be effectively tested, thereby avoiding the case that a server product goes down due to a defect of an SMI processing flow or a function design, and improving the user experience.

In order to reduce user operation and improve convenience of the user operation in the testing process, a preferred embodiment is provided based on the above embodiment. In this preferred embodiment, the target variable is a predefined system variable, and the determining a target testing model corresponding to a current value of the target variable according to a predetermined correspondence relationship includes determining a target testing model corresponding to a current value of the system variable according to the predetermined correspondence relationship.

In this embodiment, the target variable is a predefined system variable, and a specific value of the target variable is used to specify a target testing model, and other specific testing parameters required for testing the target SMM function are integrated into the target testing model. Therefore, with the method for testing robustness and stability of an SMM according to this embodiment, the user can specify a target testing model by setting a specific value for the system variable to test an SMM function that the user intends to test, without separately setting specific testing parameters, so that the user operation can be effectively reduced, and the convenience of the user operation can be improved.

In order to meet user individual requirements and improve the user experience in the testing process, another preferred embodiment is provided based on the above embodiments. In this preferred embodiment, the target variable includes multiple variables set in a target address segment, the multiple variables include a first variable and a second variable, the determining a target testing model corresponding to a current value of the target variable according to a predetermined correspondence relationship includes determining a target testing model corresponding to a current value of the first variable according to the predetermined correspondence relationship, and the testing a target SMM function with the target testing model includes testing the target SMM function based on a current value of the second variable with the target testing model.

In this embodiment, the target variable includes multiple variables set in the target address segment, including a first variable and a second variable. A specific value of the first variable is used to specify a target testing model, and a specific value of the second variable is used to set specific test parameters for testing the target SMM function. The number of the test parameters is determined according to specific testing requirements, which is not limited in the present disclosure. Therefore, with the method for testing robustness and stability of an SMM according to this embodiment, the user not only can specify a target testing model by setting a specific value for the first variable to test an SMM function that the user intends to test, but also can individually set the specific testing parameters, so that user individual requirements can be met, and the user experience can be improved.

However, it should be noted that, the specific value of the first variable is required in determining the target testing model, and the specific value of the second variable is required in testing a target SMM function with the target testing model. Therefore, the address of the target address segment should be in the SMRAM.

Another preferred embodiment is provided based on the above embodiments. In this preferred embodiment, the acquiring a target variable includes: acquiring the target variable set in an EFI shell environment.

In order to further improve the user experience, another preferred embodiment is provided based on the above embodiments. In this preferred embodiment, the judging whether an SMI is triggered includes:

judging whether a target value is received at an IO port whose address is 0xB2;

judging that the SMI is triggered if the target value is received at the IO port whose address is 0xB2; and judging that the SMI is not triggered if the target value is not received at the IO port whose address is 0xB2.

The target value is preset, which does not affect implementation of this embodiment. As long as the target value is received at the IO port whose address is 0xB2, it is considered that the SMI is triggered, otherwise it is considered that the SMI is not triggered.

In this embodiment, the SMI is triggered by software, i.e., is triggered by the SMI information over the Advanced Program Interface Controller (APIC) bus. Compared with the case that the SMI is triggered by hardware, triggering the SMI by the software is easier to be performed, improving the user operation convenience and the user experience.

Another preferred embodiment is provided based on the above embodiments. In this preferred embodiment, the acquiring a target variable includes acquiring the target variable set in an operating system environment.

Another preferred embodiment is provided based on the above embodiments. In this preferred embodiment, the judging whether an SMI is triggered includes:

judging whether a target value is received at an IO port whose address is 0xB2;

judging that the SMI is triggered if the target value is received at the IO port whose address is 0xB2; and judging that the SMI is not triggered if the target value is not received at the IO port whose address is 0xB2.

Embodiments of the method for testing robustness and stability of an SMM provided in the present disclosure have been described above in detail. A device for testing robustness and stability of an SMM is further provided in the present disclosure, which corresponds to the method for testing robustness and stability of an SMM. Since the device corresponds to the method, embodiments of the device are referred to the embodiments of the method, which are not repeated herein.

Figure 2:
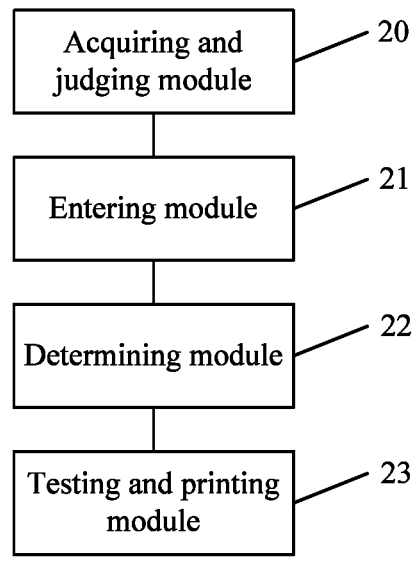
FIG. 2 is a functional block diagram of a device for testing robustness and stability of an SMM according to an embodiment of the present disclosure.

Reference is made to FIG. 2, which is a functional block diagram of a device for testing robustness and stability of an SMM according to an embodiment of the present disclosure. As shown in FIG. 2, the device for testing robustness and stability of an SMM according to this embodiment includes an acquiring and judging module 20, an entering module 21, a determining module 22, and a testing and printing module 23.

The acquiring and judging module 20 is configured to acquire a target variable and judge whether an SMI is triggered.

The entering module 21 is configured to: if it is judged that the SMI is triggered, enter an SMM and trigger the determining module.

The determining module 22 is configured to determine a target testing model corresponding to a current value of the target variable according to a predetermined correspondence relationship.

The testing and printing module 23 is configured to: test a target SMM function with the target testing model, and print serial port information by using firmware to determine the robustness and stability of the SMM.

The target testing model corresponds to the target SMM function and is pre-stored in a system management memory.

In the device for testing robustness and stability of an SMM according to this embodiment, the acquiring and judging module firstly acquires a target variable and judges whether an SMI is triggered. Once it is judged that the SMI is triggered, the SMM is entered by the entering module. In the SMM, the determining module determines a target testing model corresponding to a current value of the target variable, and the testing and printing module tests a target SMM function with the target testing model pre-stored in a system management memory and prints serial port information by using firmware. The printed serial port information is used to determine the robustness and stability of the SMM, thereby achieving the testing for the robustness and stability of the SMM. It can be seen that, with the device, the testing can be performed in the SMM, so that the problem that the testing in an operating system environment cannot cover all SMM functions is overcome, and the robustness and stability of the SMM can be effectively tested, thereby avoiding the case that a server product goes down due to a defect of an SMI processing flow or a function design, and improving the user experience.

Embodiments of the method for testing robustness and stability of an SMM provided in the present disclosure have been described above in detail. Another device for testing robustness and stability of an SMM is further provided in the present disclosure, which corresponds to the method for testing robustness and stability of an SMM. Since the device corresponds to the method, embodiments of the device are referred to the embodiments of the method, which are not repeated herein.

Figure 3:
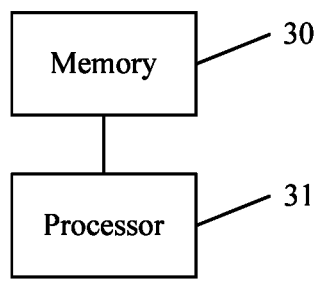
FIG. 3 is a schematic structural diagram of a device for testing robustness and stability of an SMM according to an embodiment of the present disclosure.

Reference is made to FIG. 3, which is a schematic structural diagram of a device for testing robustness and stability of an SMM according to an embodiment of the present disclosure. As shown in FIG. 3, the device for testing robustness and stability of an SMM provided according to this embodiment includes a memory 30 and a processor 31.

The memory 30 is configured to store a testing program.

The processor 31 is configured to execute the testing program to perform the method for testing robustness and stability of an SMM according to any one of the above embodiments.

With the device for testing robustness and stability of an SMM according to this embodiment, the processor can call the testing program stored in the memory to perform the method for testing robustness and stability of an SMM according to any one of the above embodiments. The testing device has the same practical effect as the method for testing robustness and stability of an SMM.

A computer readable storage medium is further provided in the present disclosure. The computer readable storage medium has stored thereon a testing program. The testing program, when executed by a processor, causes the processor to perform the method for testing robustness and stability of an SMM according to any one of the above embodiments.

With the computer readable storage medium according to this embodiment, a testing program can be stored in the computer readable storage medium. When executed by a processor, the testing program can cause the processor to perform the method for testing robustness and stability of an SMM according to any one of the above embodiments. The computer readable storage medium has the same practical effect as the method for testing robustness and stability of an SMM.

The method and the device for testing robustness and stability of an SMM, and the storage medium provided in the present disclosure have been described in detail above. Embodiments in this specification are described in a progressive manner, each of the embodiments emphasizes differences from other embodiments, and the same or similar parts among the embodiments can be referred to each other.

It should be noted that improvements and modifications may also be made by those skilled in the art without departing from the principle of the present disclosure. Those improvements and modifications should also fall in the protection scope of the claims of the present disclosure.

It should further be noted that the relationship terms such as "first" and "second" are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a series of elements includes not only the elements but also other elements that are not enumerated, or further includes elements inherent for the process, method, article or device. Unless expressively limited otherwise, the statement "comprising (including) one . . . " does not exclude the case that other similar elements may exist in the process, method, article or device.

The invention claimed is:

1. A method for testing robustness and stability of a system management mode (SMM), the method comprising:
acquiring a target variable and judging whether a system management interrupt (SMI) is triggered;
entering the SMM if it is judged that the SMI is triggered;
determining a target testing model corresponding to a current value of the target variable according to a predetermined correspondence relationship; and
testing a target SMM function with the target testing model, and printing serial port information by using firmware to determine the robustness and stability of the SMM, wherein
the target testing model corresponds to the target SMM function and is pre-stored in a system management memory.

2. The method for testing robustness and stability of an SMM according to claim 1, wherein
the target variable is a predefined system variable; and
the determining a target testing model corresponding to a current value of the target variable according to a predetermined correspondence relationship comprises: determining a target testing model corresponding to a current value of the system variable according to the predetermined correspondence relationship.

3. The method for testing robustness and stability of an SMM according to claim 1, wherein
the target variable comprises a plurality of variables set in a target address segment, the plurality of variables comprising a first variable and a second variable;
the determining a target testing model corresponding to a current value of the target variable according to a predetermined correspondence relationship comprises: determining a target testing model corresponding to a current value of the first variable according to the predetermined correspondence relationship; and
the testing a target SMM function with the target testing model comprises: testing the target SMM function based on a current value of the second variable with the target testing model.

4. The method for testing robustness and stability of an SMM according to claim 1, wherein the acquiring a target variable comprises:
acquiring the target variable set in an EFI shell environment.

5. The method for testing robustness and stability of an SMM according to claim 4, wherein the judging whether an SMI is triggered comprises:
judging whether a target value is received at an IO port whose address is 0xB2;
judging that the SMI is triggered if the target value is received at the IO port whose address is 0xB2; and
judging that the SMI is not triggered if the target value is not received at the IO port whose address is 0xB2.

6. The method for testing robustness and stability of an SMM according to claim 1, wherein the acquiring a target variable comprises:
acquiring the target variable set in an operating system environment.

7. The method for testing robustness and stability of an SMM according to claim 6, wherein the judging whether an SMI is triggered comprises:
judging whether a target value is received at an IO port whose address is 0xB2;
judging that the SMI is triggered if the target value is received at the IO port whose address is 0xB2; and
judging that the SMI is not triggered if the target value is not received at the IO port whose address is 0xB2.

8. A non-transitory computer readable storage medium having stored thereon a testing program, wherein the testing program, when executed by a processor, causes the processor to perform the method for testing robustness and stability of an SMM according to claim 1.

9. A device for testing robustness and stability of a system management mode (SMM), the device comprising: an acquiring and judging module, an entering module, a determining module, and a testing and printing module, wherein
the acquiring and judging module is configured to acquire a target variable and judge whether a system management interrupt (SMI) is triggered;
the entering module is configured to: if it is judged that the SMI is triggered, enter the SMM and trigger the determining module;
the determining module is configured to determine a target testing model corresponding to a current value of the target variable according to a predetermined correspondence relationship; and
the testing and printing module is configured to: test a target SMM function with the target testing model, and print serial port information by using firmware to determine the robustness and stability of the SMM, wherein
the target testing model corresponds to the target SMM function and is pre-stored in a system management memory.

10. A device for testing robustness and stability of a system management mode (SMM), the device comprising:
a memory configured to store a testing program, and
a processor configured to execute the testing program to perform operations of:
acquiring a target variable and judging whether a system management interrupt (SMI) is triggered;
entering the SMM if it is judged that the SMI is triggered;
determining a target testing model corresponding to a current value of the target variable according to a predetermined correspondence relationship; and
testing a target SMM function with the target testing model, and printing serial port information by using firmware to determine the robustness and stability of the SMM,
wherein the target testing model corresponds to the target SMM function and is pre-stored in a system management memory.

11. The device for testing robustness and stability of an SMM according to claim 10, wherein
the target variable is a predefined system variable; and
the determining a target testing model corresponding to a current value of the target variable according to a predetermined correspondence relationship comprises: determining a target testing model corresponding to a current value of the system variable according to the predetermined correspondence relationship.

12. The device for testing robustness and stability of an SMM according to claim 10, wherein the target variable comprises a plurality of variables set in a target address segment, the plurality of variables comprising a first variable and a second variable;

the determining a target testing model corresponding to a current value of the target variable according to a predetermined correspondence relationship comprises: determining a target testing model corresponding to a current value of the first variable according to the predetermined correspondence relationship; and the testing a target SMM function with the target testing model comprises: testing the target SMM function based on a current value of the second variable with the target testing model.

13. The device for testing robustness and stability of an SMM according to claim 10, wherein the acquiring a target variable comprises:

acquiring the target variable set in an EFI shell environment.

14. The device for testing robustness and stability of an SMM according to claim 13, wherein the judging whether an SMI is triggered comprises:

judging whether a target value is received at an IO port whose address is 0xB2;

judging that the SMI is triggered if the target value is received at the IO port whose address is 0xB2; and judging that the SMI is not triggered if the target value is not received at the IO port whose address is 0xB2.

15. The device for testing robustness and stability of an SMM according to claim 10, wherein the acquiring a target variable comprises:

acquiring the target variable set in an operating system environment.

16. The device for testing robustness and stability of an SMM according to claim 15, wherein the judging whether an SMI is triggered comprises:

judging whether a target value is received at an IO port whose address is 0xB2;

judging that the SMI is triggered if the target value is received at the IO port whose address is 0xB2; and judging that the SMI is not triggered if the target value is not received at the IO port whose address is 0xB2.

* * * * *